United States Patent
Chen et al.

(10) Patent No.: US 11,812,151 B2
(45) Date of Patent: Nov. 7, 2023

(54) SMARTPHONE AND BATTERY INTEGRATION MODULE FOR AN ELECTRIC SCOOTER

(71) Applicant: Ford Global Technologies, LLC, Dearborn, MI (US)

(72) Inventors: Yifan Chen, Ann Arbor, MI (US); Raj Sohmshetty, Canton, MI (US); Jianbo Lu, Northville, MI (US); Scott Mayberry, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 797 days.

(21) Appl. No.: 16/919,185

(22) Filed: Jul. 2, 2020

(65) Prior Publication Data
US 2022/0006959 A1 Jan. 6, 2022

(51) Int. Cl.
*B62J 45/20* (2020.01)
*H04N 23/695* (2023.01)
(Continued)

(52) U.S. Cl.
CPC ............... *H04N 23/695* (2023.01); *B60S 5/06* (2013.01); *B62J 43/20* (2020.02); *B62J 43/30* (2020.02);
(Continued)

(58) Field of Classification Search
CPC ... B62J 45/20; B62J 45/10; B62J 45/00; B62J 50/22; B60R 1/00; B60R 11/04; B60R 1/02
See application file for complete search history.

(56) References Cited

U.S. PATENT DOCUMENTS 6,027,828 A * 2/2000 Hahn .................. H04M 1/0262
429/96
10,189,525 B2 * 1/2019 Allen ......................... B62J 9/21
(Continued)

FOREIGN PATENT DOCUMENTS

CN 103947070 A * 7/2014 .......... H01M 2/1055

OTHER PUBLICATIONS

Machine Translation of CN 103947070-A. (Year: 2014).*
(Continued)

*Primary Examiner* — Adam J Waggenspack
(74) *Attorney, Agent, or Firm* — Brandon Hicks; Eversheds Sutherland (US) LLP

(57) ABSTRACT

A battery expansion cradle is attachable to an electric scooter (eScooter) handlebar. The battery expansion cradle includes a battery connection terminal disposed on a face of the battery expansion cradle, where the battery connection terminal electrically connects with a power bus of the electric scooter. A battery module is removably attachable to the face of the battery expansion cradle and the back terminal of another battery. The battery module includes a connector electrically coupling the first rechargeable battery to the eScooter power bus, and includes a mobile device holder disposed on a face of the first battery module with holding means for securing a mobile device to the face of the battery module, which may be offset from the center of the external battery to allow for a clear forward view of the scooter using the smartphone's front camera, and the user's face using the rear camera.

13 Claims, 8 Drawing Sheets

(51) Int. Cl.
  *B62J 43/20* (2020.01)
  *B62J 43/30* (2020.01)
  *H01M 50/20* (2021.01)
  *B60S 5/06* (2019.01)
  *H04M 1/04* (2006.01)
  *H04N 23/45* (2023.01)
  *G03B 29/00* (2021.01)

(52) U.S. Cl.
  CPC ............ *H01M 50/20* (2021.01); *H04M 1/04* (2013.01); *H04N 23/45* (2023.01); *G03B 29/00* (2013.01); *H01M 2220/20* (2013.01); *H04M 2250/52* (2013.01)

(56) References Cited

U.S. PATENT DOCUMENTS

| | | | | |
|---|---|---|---|---|
| 10,789,790 | B1* | 9/2020 | Vandenbussche | B62J 50/22 |
| 10,940,807 | B2* | 3/2021 | Nakakura | B60R 11/04 |
| 11,303,143 | B2* | 4/2022 | Taylor | H02J 50/10 |
| 2011/0227527 | A1* | 9/2011 | Zhu | H02J 7/0044 |
| | | | | 320/108 |
| 2013/0270016 | A1 | 10/2013 | Donnell et al. | |
| 2015/0251540 | A1 | 9/2015 | Matsuda | |
| 2019/0248439 | A1 | 8/2019 | Wang et al. | |
| 2020/0144837 | A1* | 5/2020 | To | H02J 7/0045 |

OTHER PUBLICATIONS

"Battery Swapping Station—Hangzhou Dekang Intelligent Equipment Co., Ltd.," Web page <https://dekang.en.made-in-china.com/product-group/ZelmNvVhApYL/Battery-Swapping-Station-catalog-1.html>, 2 pages, retrieved from the internet on Oct. 2, 2020.

"China sharing electric scooter from Shenzhen Manufacturer: Shenzhen MYWAY Technology Co. Ltd," Web page <https://mywayth.manufacturer.globalsources.com/si/6008852343113/pdtl/Electric-scooter/1163832953/sharing-electric-scooter.html>, 3 pages, retrieved from the internet on Oct. 2, 2020.

* cited by examiner

SMARTPHONE AND BATTERY INTEGRATION MODULE FOR AN ELECTRIC SCOOTER

TECHNICAL FIELD

The present disclosure relates to electric scooters, and more particularly, to a smartphone and battery integration module for an electric scooter.

BACKGROUND

Short-distance transportation using personal transport vehicles, such as electric scooters (eScooters), are sometimes more convenient than traditional (full sized) automobiles in densely populated urban environments. Although the small footprint of the devices may increase their utility for personal transportation, it may be challenging to manage a fleet of electric scooters due to charging requirements and distribution to higher-demand locations. Maintaining charged batteries for an entire fleet of electric scooters can also be challenging when the rechargeable batteries are integrated with the eScooters.

An eScooter is disclosed in U.S. Patent Pub. No. 2019/0248439 (hereafter "the 439 publication"). The 439 publication describes detachable batteries and a control unit including a navigation device. The control unit described in the 439 publication may be used to determine information such as the velocity and direction of the eScooter and may be used to autonomously navigate the eScooter to a location. While the system of the 439 publication may include swappable batteries and provide some navigational features and object detection capability, the 439 publication does not disclose integrating the swappable battery with an adjustable smartphone cradle that allows the rider to monitor the view forward and capture a view of the rider's face simultaneously using onboard cameras on the smartphone. This can be important if the rider wishes to extend the battery life of the electric scooter using an additional battery pack while simultaneously charging their own device and utilizing navigation, gyroscope, and other features built into their mobile device.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
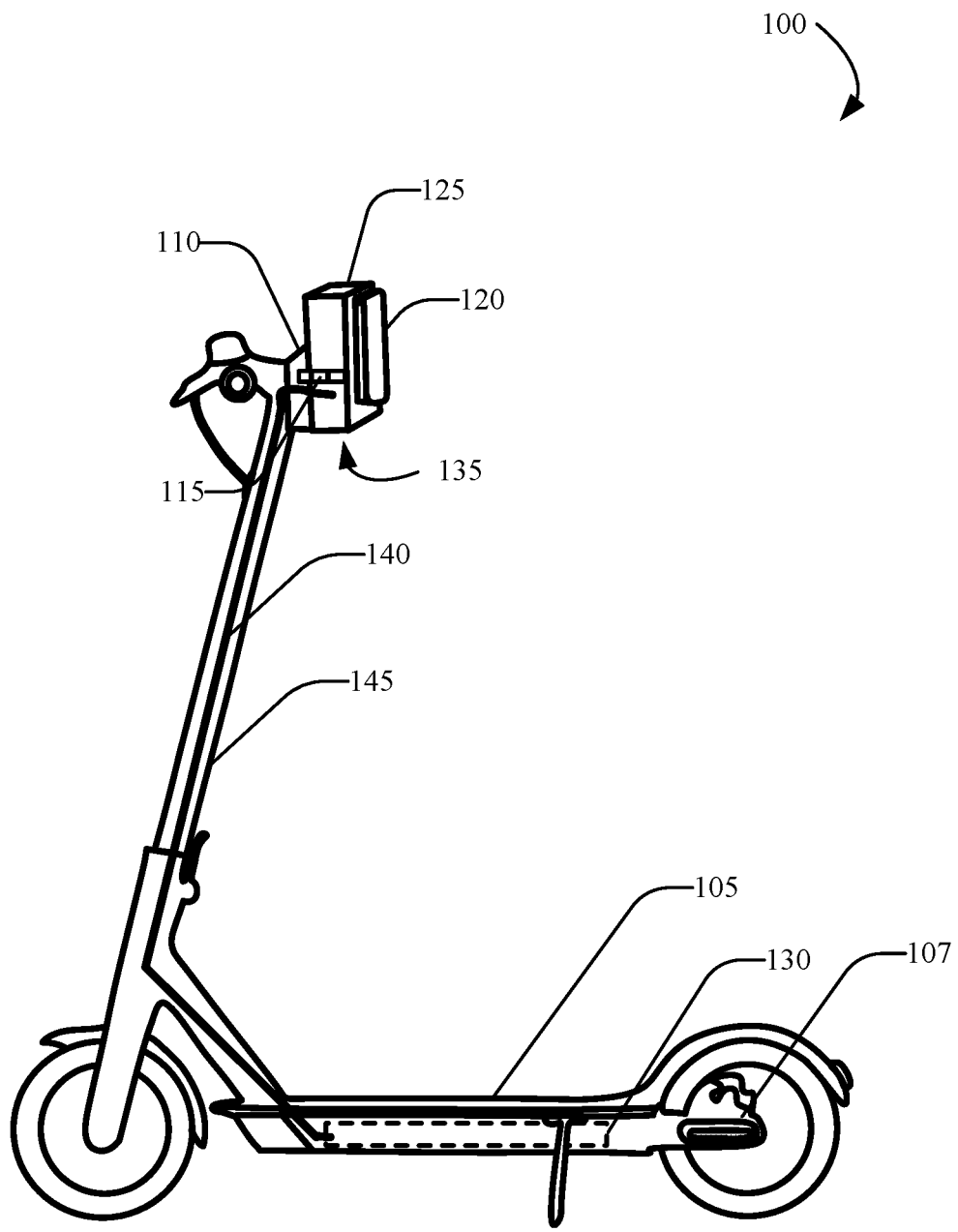
FIG. 1 depicts an example electric scooter and mobile device battery integration module in accordance with the present disclosure.

The systems and methods disclosed herein are directed to an electric scooter (eScooter) mobile device interface module that allows a rider to attach an external battery (e.g., a swappable battery that may be connected to a battery fixed on the eScooter) and a mobile device, such as a smartphone, for computational resources, connectivity, and a human-machine interface (HMI). Thermal management may be used to transfer heat between the fixed battery, swappable battery, and smartphone. The external battery may also be capable of receiving the smartphone and may function to charge the smartphone attached to the eScooter. Charging may be achieved through a USB port on the external battery or inductive charging. Additionally, the smartphone may be mounted offset from the center of the external battery to allow for a clear view using the smartphone's front and rear cameras. The external battery base may also be mounted on a swivel to allow the smartphone cameras to change viewing angle.

Embodiments of the present disclosure describe an apparatus for supplementing or replacing the power supply for an electric scooter. The apparatus includes a mobile device battery integration module having a battery expansion cradle that can be attached to an electric scooter handlebar. The battery expansion cradle can include a battery connection terminal disposed on a face of the battery expansion cradle that electrically connects a removable rechargeable battery with a power bus of the electric scooter. The mobile device battery integration module may further include a battery module that may house the rechargeable battery, which can be removably attachable to the face of the battery expansion cradle using clips or other similar fastening means. The battery module can include a first connector on a back face of the battery module that electrically couples the rechargeable battery to either the eScooter power bus (via the battery connection terminal) or to a second rechargeable battery installed in the battery expansion cradle, and a second connector on a front face of the battery module that is connectable to a second battery module, which can wire two or more batteries in parallel for extended powering of the eScooter. The apparatus also includes a mobile device holder disposed on the front face of the first battery module, and holding means for securing a mobile device to the battery module when installed on the battery expansion cradle, and positioning mechanisms that may position the mobile device such that the front and rear cameras of the mobile device can capture a view of the road ahead and the user's face while in use.

Example embodiments may provide enhanced user experience by allowing eScooter users to supplement or replace the power supply of the eScooter, and charge their mobile devices while integrating their devices. The gyroscope and camera equipment common to modern day mobile devices may be leveraged to provide navigational interfaces, safety features, and general connect ability with the eScooter controller. Embodiments described herein may also reduce operational costs associated with maintaining fleets of eScooters by providing a way for eScooter users to bring their own power supply and connect that power supply to the scooter for supplemental or replacement power.

These and other advantages of the present disclosure are provided in greater detail herein.

Illustrative Embodiments

The disclosure will be described more fully hereinafter with reference to the accompanying drawings, in which exemplary embodiments of the disclosure are shown, and not intended to be limiting.

FIG. 1 depicts an example electric scooter and mobile device battery integration module in accordance with the present disclosure. Although illustrated as a two-wheeled electric scooter, the eScooter 105 may be any one or more other types of electric transportation devices such as, for example, personal transportation vehicles having any number of wheels, personal mobility vehicles, etc. One example of such a vehicle is described in U.S. Patent Application Publication No. 2018/0101179 (hereafter "the '179 publication"), assigned to Ford Global Technologies LLC and incorporated herein by reference. The '179 publication describes a fleet of autonomous three-wheeled vehicles having a navigation system configured to provide autonomous point-to-point navigation within a specified geographic area. The autonomous scooters 105 and 115, among others, may be substantially similar or identical to the vehicles described in the '179 publication in design and/or functionality, and more particularly, in control system configuration.

The eScooter 105 may include an integrated eScooter battery 130 that connects with an eScooter power bus 140. The eScooter battery 130 may power one or more drive motors disposed at the wheels or in another area of the eScooter 105. The eScooter 105 may further include a battery expansion cradle system 135. In other embodiments, the eScooter 105 may not include an integrated battery, but instead be powered exclusively by the battery module 125, and any supplemental battery modules coupled to the battery module 125 (not shown in FIG. 1).

The battery expansion mobile device cradle assembly can include a battery expansion cradle 110 disposed on a handlebar riser tube 145, and may include a battery module 125 disposed on a face of the battery expansion cradle 110 by way of a releasable attachment clip 115 configured to removably connect the battery expansion cradle 110 with the battery module 125.

The battery module 125 may include a first rechargeable battery, and may be removably attachable to the face of the battery expansion cradle 110. As described with respect to FIG. 2A, the battery module 125 may include a connector electrically coupling the rechargeable battery housed inside of the battery module 125. The battery module 125 may further include a mobile device holder disposed on a face of the battery module 125. The mobile device holder may include holding means for securing a mobile device 120 to the face of the battery module 125. The holding means may include, for example, one or more magnetic fasteners that securely hold the mobile device 120 in position to face the rider (not shown in FIG. 1).

Figure 2A:
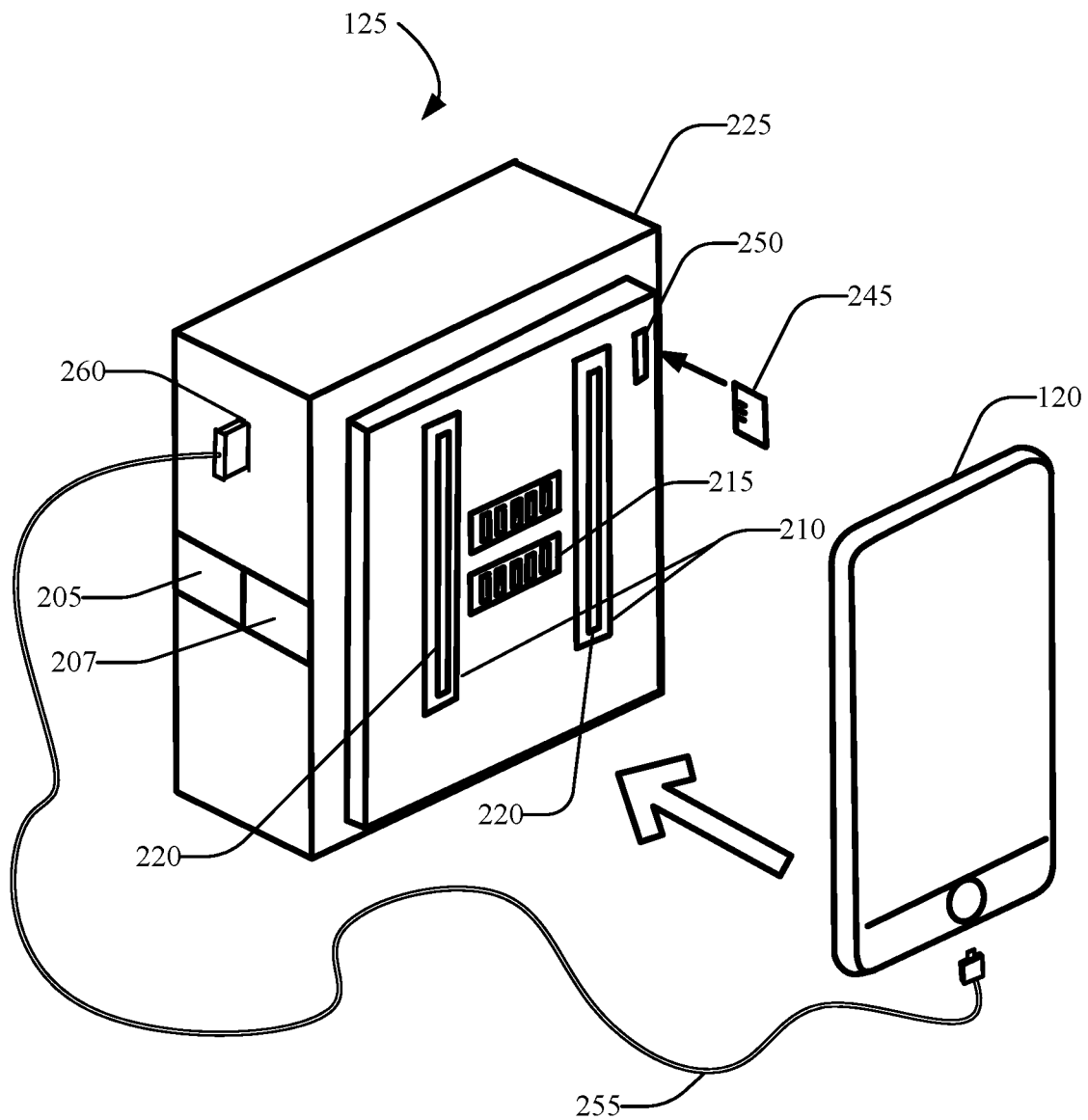
FIG. 2A illustrates a mobile device and battery integration module in accordance with the present disclosure.

FIG. 2A illustrates the mobile device and battery module 125 in greater detail, in accordance with the present disclosure. The battery module 125 may include a rechargeable battery (not shown) encapsulated by a battery module housing 225 that seals the battery from weather and foreign matter when in use. The battery module 125 may include one or more a releasable attachment clips 205 configured to removably connect the battery expansion cradle 110 (depicted in FIG. 1) with the battery module 125. The battery module 125 may further include one or more front face releasable attachment clips 207 configured to removably connect the battery module 125 to a second battery module (depicted with respect to FIG. 2B).

The rechargeable battery may be configured to have multiple charge capacities give a single size battery module housing 225. For example, the rechargeable battery may include one or more fixed batteries having an expected charge capacity. A particular charge capacity may be expected to provide a commensurate travel ability in terms of distance that may be traveled on a fully charged battery. A first example battery size may include one or more batteries housed in the battery module housing 225 having approximately 200 Watt/hours (Wh) charge capacity, which may provide an expected range of travel of approximately 13.5 miles. In another aspect, another example rechargeable battery configuration may provide an expected range of travel of approximately 4.5 miles having 70 Wh charge capacity. By way of another example, the rechargeable battery may include a 140 Wh charge capacity that can provide an expected 9-mile range of travel, or a 210 Wh battery capacity that can provide 13.5 expected miles of expected travel. Other battery capacities are possible and contemplated, and are generally based on various rechargeable battery technologies available for commercial use. Moreover, the travel ranges associated with particular battery capacities in a single battery module housing may be more or less based on battery technology used, the geography of the roads traveled, the particular vehicle with which the batteries are operating, and other factors such as battery wear, atmospheric temperature, etc.

The battery module 125 may be attachable to the battery expansion cradle 110 by way of the one or more releasable attachment clips 205 that mate with the releasable attachment clips 115 (as shown in FIG. 1). The releasable attachment clips 115 may be attach the battery module housing 225 to the battery expansion cradle 110 using one or more actuators driven by a processor (not shown in FIG. 1) connected to a control system for the eScooter 105. For example, the control system may be configured to authenticate a user, user account, mobile device, or some other means for user authentication, and engage or release the releasable attachment clips 115 responsive to user authentication. In another example embodiment, the releasable attachment clips 115, 205, and/or 207 may be manually operated attachment means such as, for example, a clamp, a buckle, a snap, a spring-loaded clip, etc.

The battery module may include a memory port 250 configure to receive a removable flash memory module 245 that may provide persistent memory for the battery module 125. In one example, the flash memory module 245 may include information associate with the eScooter battery expansion cradle system including, for example, one or more user preferences, account information for authenticating the user with a central server that coordinates eScooter fleet rentals, and other information.

In one example embodiment, the battery module 125 may include one or more battery connection terminals 215 that can electrically couple the rechargeable battery housed in the battery module housing 225 with a second battery module (e.g., the second battery module 240 depicted in FIG. 2), and/or the eScooter power bus 140 (as shown in FIG. 1). The battery module 125 may electrically connect the rechargeable battery with the eScooter power bus 140 by way of a set of mating electrical connectors (not shown in FIG. 1) disposed in a front face of the battery expansion cradle 110. Additionally, the battery module 125 may include a second set of battery connection terminals (not shown in FIG. 2) disposed on a back surface of the battery module 125 such that any two or more battery modules (e.g., the battery module 125, the second battery module 240 shown in FIG. 2, etc.) may be connected together to expand the travel capacity of the eScooter 105. When two or more battery modules are connected together and attached to the battery expansion cradle 110, the batteries may form a parallel power circuit that can charge the eScooter battery 130 (as shown in FIG. 1) when the eScooter includes an integrated battery. The battery module 125 may include a circuit breaker disposed in connection with a power monitoring circuit such that the circuit breaker may break the charging connection to prevent excessive current draw, and to prevent power spikes caused by a malfunction of the eScooter 105 and/or the eScooter battery expansion cradle system 100.

In some aspects, the battery module 125 may further include one or more auxiliary power connection ports, and charge the mobile device 120 when the mobile device 120, or another electronic device is connected with the eScooter battery expansion cradle system 100 via a connection cable 255. Accordingly, the mobile device 120 may electrically connect to the battery module 125 to recharge, and may also be disposed in communication with the eScooter control system to perform aspects of eScooter operation such as navigation, object avoidance, audio-video integrations, and other functionalities.

The battery module 125 may also include a mobile device holder 210 for holding the mobile device 120. The mobile device holder 210 may include one or more magnetic strips configured to attract a metal contact plate (not shown in FIG. 2A) disposed on a rear portion of the mobile device 120. In some embodiments, the mobile device holder 210 may be or include attachment fingers, rails, or other attaching means that can secure the mobile device to the battery module 125.

The battery module 125 may further include one or more thermal transfer mechanisms 220 configured to transfer battery heat to the mobile device 120 during cold weather conditions. The thermal transfer mechanisms 220 may be and/or include heat conducting material such as brass or another heat conductive material that may draw thermal energy emitted from the rechargeable battery during use and transfer the thermal energy to a surface in contact with the mobile device 120. Accordingly, the heat generated during eScooter operation may transfer from the battery module 125 to the mobile device 120 such that the mobile device 120 may operate normally under cold weather conditions. Although the thermal transfer mechanisms 220 are depicted as part of (or integral with) the mobile device holder 210, it should be appreciated that when the thermal transfer mechanisms 220 are included with the eScooter battery expansion cradle system 100, the thermal transfer mechanisms 220 may be disposed on any surface of the battery module 125 that touches the mobile device 120.

Figure 2B:
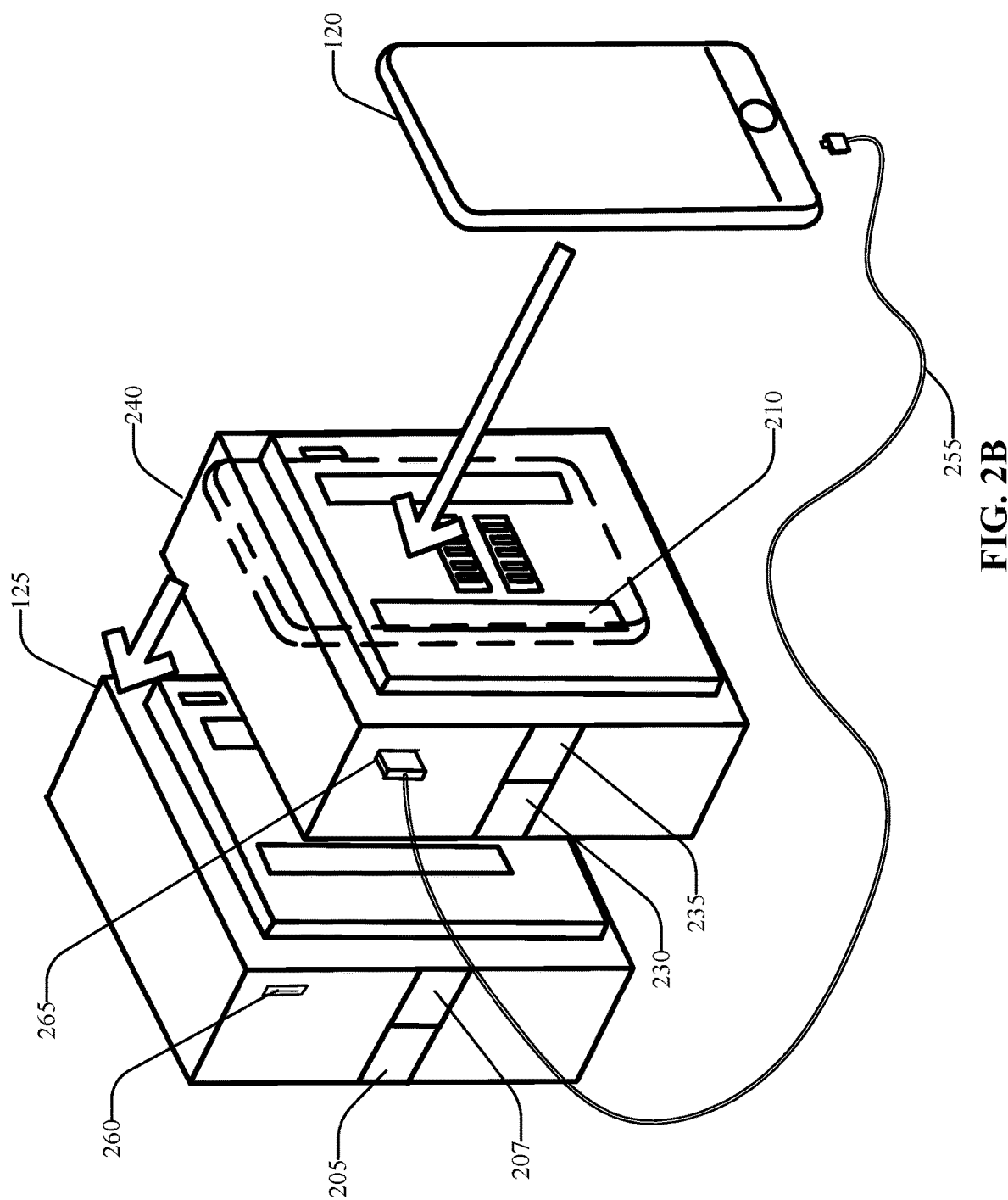
FIG. 2B depicts the mobile device and battery integration module of FIG. 2A with an additional battery module in accordance with the present disclosure.

FIG. 2B depicts the mobile device and battery integration module of FIG. 2A with an additional battery module 240, in accordance with the present disclosure. The battery module 125 may include the releasable attachment clips 205 to attach the battery module 125 to the battery expansion cradle 110 (as depicted in FIG. 1). Additionally, the front face releasable attachment clips 207 may be configured to attach to mating releasable attachment clips 230 on the second battery module 240 such that the battery modules 125 and 240 are operable as a single battery unit when connected together. The mobile device 120 may connect with either the battery module 1234 via the auxiliary connection ports 260 or the auxiliary connection ports 265 of the second battery module 240. The mobile device 120 may be configured to attach with the top battery module (which is, in FIG. 2, the second battery module 240) by way of the mobile device holder 210.

Figure 3B:
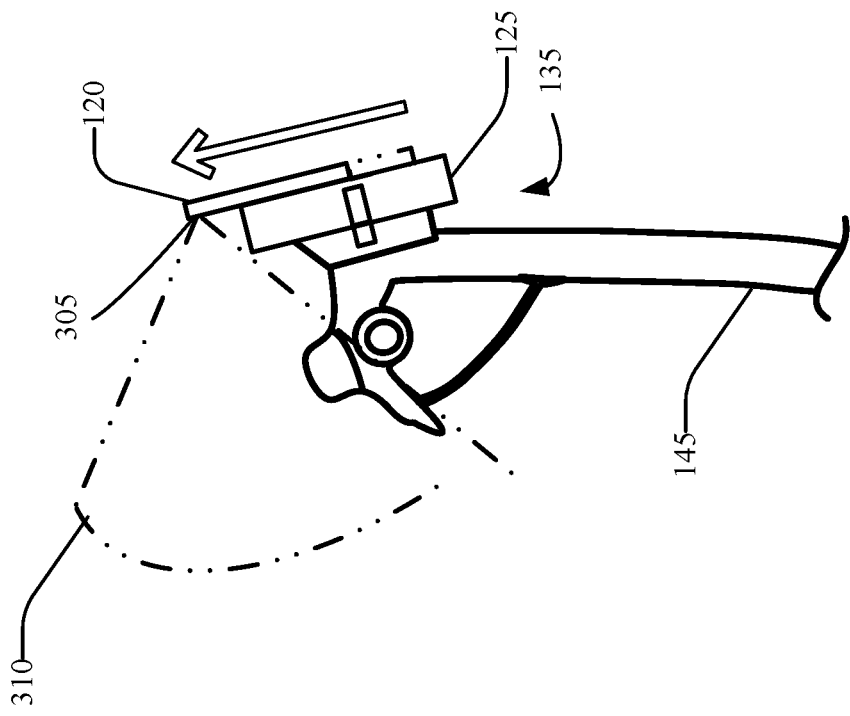
FIGS. 3A and 3B illustrate various modes of the battery integration module in accordance with the present disclosure.
Figure 3A:
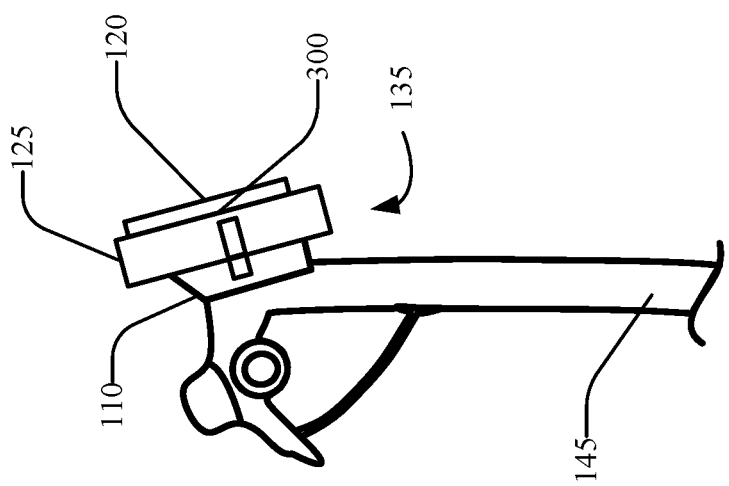

FIGS. 3A and 3B illustrate various modes of the battery expansion cradle system 135, in accordance with the present disclosure. FIG. 3A depicts the mobile device 120 attached to a face 300 of the battery expansion cradle 110, which is attached to the handlebar riser tube 145. In the embodiments depicted in FIGS. 1-5, the mobile device 120 is a smartphone. Most smartphones today can include multiple camera systems designed to capture images in front of the device and also capture the device user (e.g., a selfie camera pointed toward the user). As shown in FIG. 3A, the mobile device 120 may be positioned on the battery module 125 such that the forward-facing camera (not shown in FIG. 3A) is unable to capture images in front of the eScooter 105, but the selfie camera (not shown in FIG. 3A) would be able to capture images of the user (not shown in FIG. 3A) riding the eScooter 105. However, it may be advantageous to utilize both cameras of the mobile device 120 such that the mobile device 120 has a forward-facing view of a forward path of the eScooter 105.

FIG. 3B depicts the mobile device 120 repositioned by sliding the mobile device 120 along the face 300 of the battery module 125 such that a forward-facing camera 305 of the mobile device 120 has a forward-facing view 310 of a forward path of the eScooter 105. In one embodiment, the mobile device 120 may be manually repositioned by a user.

Figure 4:
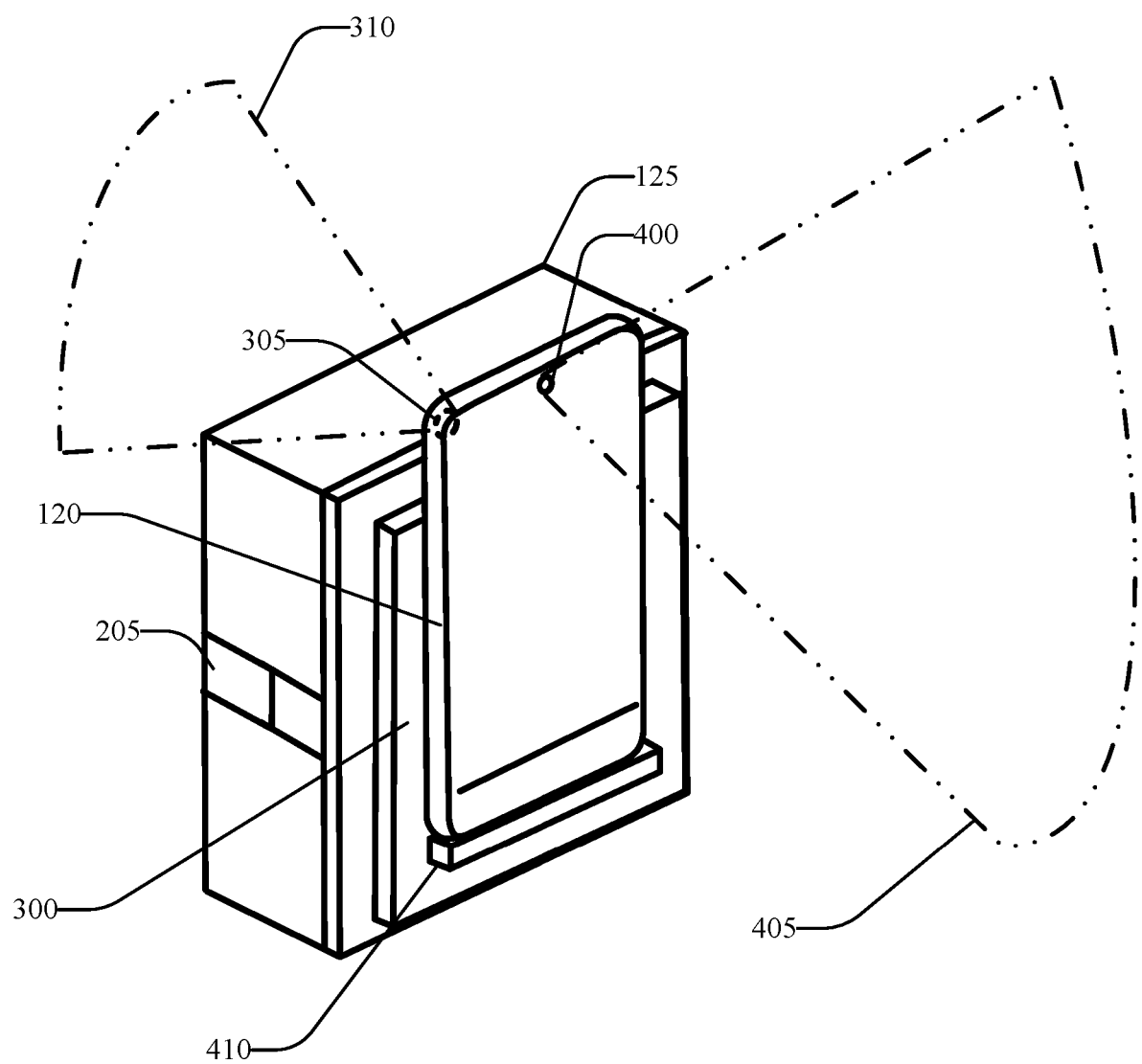
FIG. 4 depicts another battery integration module with a mobile device repositioning actuator in accordance with the present disclosure.

In another embodiment, as depicted in FIG. 4, the battery module 125 may include an actuating member 410 configured to reposition the mobile device 120 by sliding the mobile device along the face of the battery module 125 such that the forward-facing camera 305 of the mobile device 120 has a forward-facing view of a forward path of the eScooter 105. The rear-facing camera 400 may be configured such that a face of a rider (not shown in FIG. 4) is within view 405 of the rear-facing camera 400.

In one aspect, the actuating member 410 is actuatable to cause the mobile device 120 to slide the mobile device 120 along the face of the first battery module such that the forward-facing camera 305 of the mobile device has a forward-facing view 310 of a forward path of the electric scooter. Accordingly, the actuating member 410 may be or include one or more servos that cause the actuating member 410 to apply force to an edge of the mobile device 120 such that it slides along the face 300 of the battery module 125.

Figure 5:
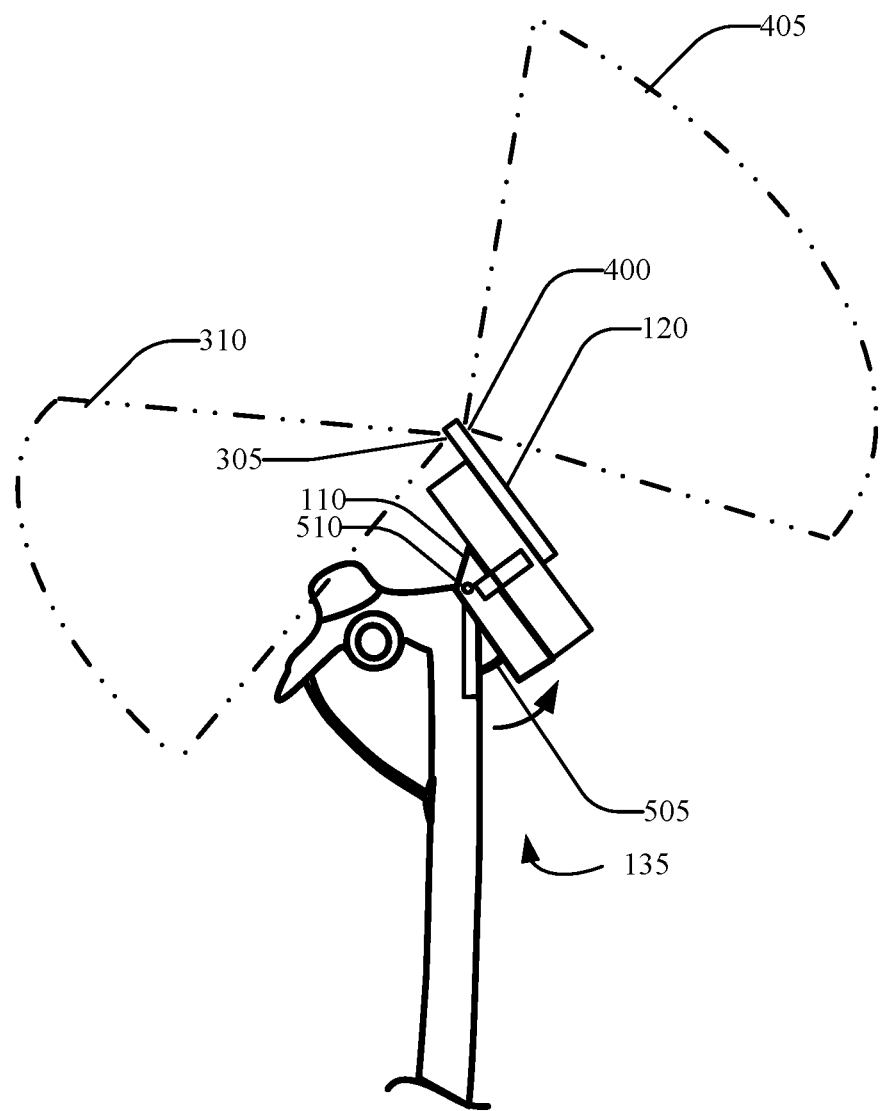
FIG. 5 illustrates another mode of the mobile device and battery integration module in accordance with the present disclosure.

FIG. 5 illustrates another mode of the mobile device and battery integration module in accordance with the present disclosure. When the mobile device 120 is held to the face 300 of the battery module 125, the viewing angles of the forward-facing camera 305 and the rear-facing camera 400 may not be optimal for viewing the forward path of the eScooter 105 and for viewing the face of the eScooter user (not shown in FIG. 5). In one embodiment, it may be advantageous to rotate the battery module 125 and the mobile device 120 in a downward forward-facing position as shown in FIG. 5. Accordingly, the battery expansion cradle 110 may include an axial pivot mechanism 505 configured to tilt the battery expansion cradle 110 about a pivot axis 510. Accordingly, the axial pivot mechanism 505 may be actuated to reposition the battery expansion cradle 110 by pushing the cradle forward and rotating the battery module 125 and the mobile device 120 from a position substantially parallel to a handlebar riser tube 145 to an angled position with respect to the handlebar riser tube 145. Accordingly, the mobile device 120 may capture images of the path directly in front of the eScooter 105, and also capture a facial view of the rider of the eScooter. In other instances, the battery expansion cradle comprises an axial pivot mechanism configured to moveably secure the battery expansion cradle laterally along the electric scooter handlebar. That is, the battery cradle (along with the smart phone) may be re-positioned laterally along the handle bar to get a good line of sight with the road/traffic behind the rider. For example, the position may be offset towards the traffic side. This lateral adjustment may be in addition to the vertical positioning and rotation function.

Having both views available to the mobile device 120 may be important to enable navigation features and safety features that use the camera systems of the mobile device 120. For example, an application may be installed on the mobile device that determines, using the rear-facing camera 500, whether the eScooter user (not shown) is wearing a helmet. Responsive to determining that the user is not wearing a helmet, the application ma output a reminder to the user. In other aspects, the mobile device 120 may communicate information to a remote server operative as part of the eScooter fleet with information indicative of a lack of safety gear worn by the user, which may be important information when determining circumstances associated with a vehicle accident, and for other conceivable purposes. In another example embodiment, the forward-facing camera 305 may record the forward path of the eScooter 105, may provide inputs for navigational features, and/or may provide object detection and/or avoidance to the eScooter 105.

Figure 6:
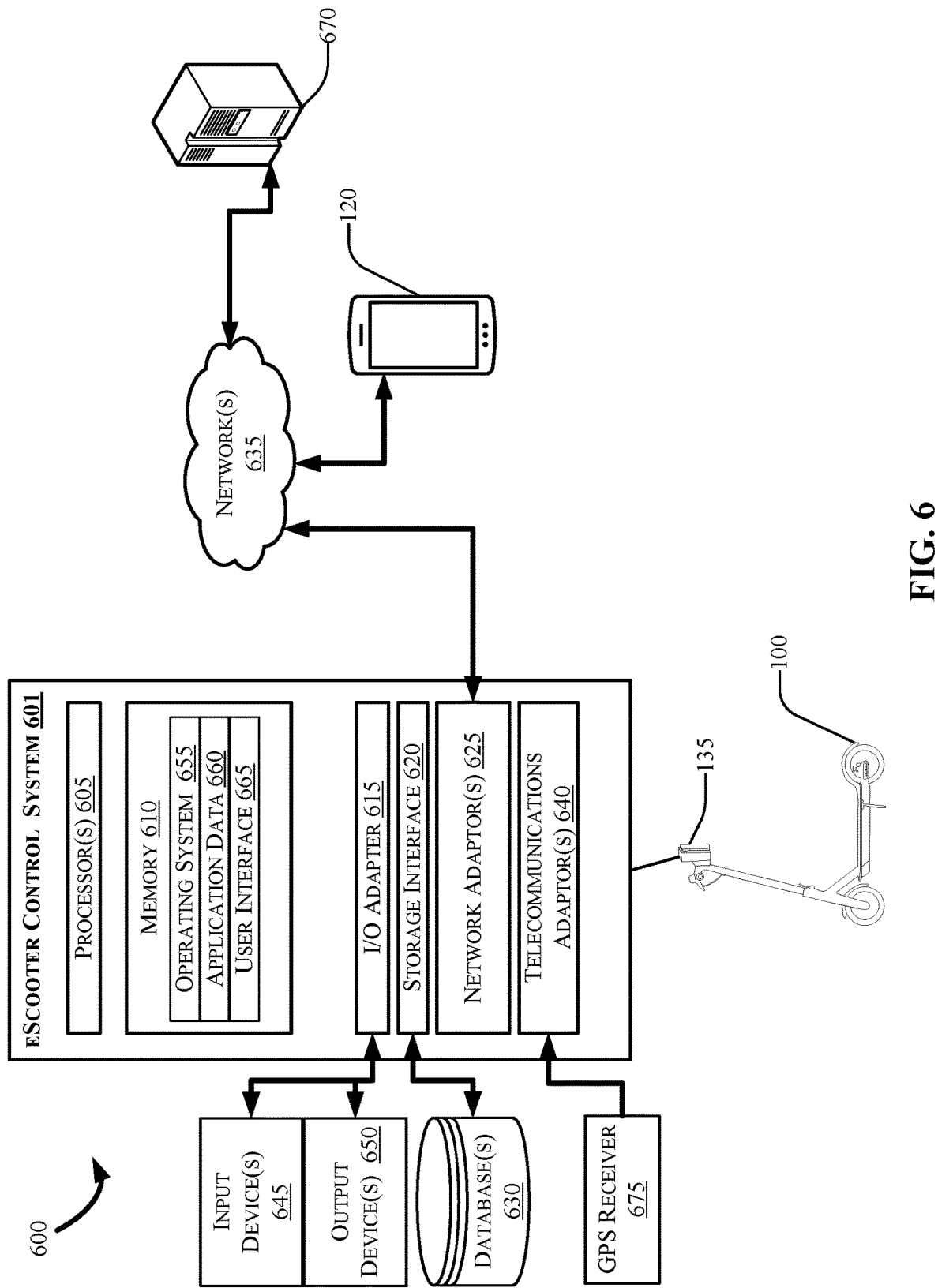
FIG. 6 illustrates a block diagram of an exemplary computing environment and computer system for use in practicing the embodiments described herein.

FIG. 6 illustrates a block diagram of an exemplary computing environment 600, which may include an eScooter control system 600 for use in practicing the embodiments described herein. The environment and system described herein can be implemented in hardware, software (e.g., firmware), or a combination thereof.

The eScooter control system 601 may be implemented in a device that is separate from but communicatively coupled to one or more vehicle telematic devices such as the telematics system (not shown) associated with the eScooter 105. Some examples of a telematics system can include an infotainment system mounted on the handlebar riser tube 145 or on some other area of the eScooter 105, a radio communications device integrated with the eScooter 105, or a personal device such as a the mobile device 120, which may be carried by a user.

The computing system 601 may include the one or more processor(s) 605, memory 610 communicatively coupled to the one or more processor(s) 605, and one or more input/output adaptors 615 that can communicatively connect with external devices such as, for example, input devices 645 and/or output devices 650. The computing system 601 may operatively connect to and communicate information with one or more internal and/or external memory devices such as, for example, one or more databases 625 via a storage interface 620. The computing system 601 may also include one or more network adaptor(s) 625 enabled to communicatively connect the computing system 601 with one or more networks 635. In one embodiment, the computing system 601 can include one or more telecommunications network(s) for communication between the computing system 500 and any external device. In such embodiments, the computing system 601 can further include one or more telecommunications adaptor(s) 640.

The one or more processor(s) 605 are collectively a hardware device for executing program instructions (aka software), stored in a computer-readable memory (e.g., the memory 610). The one or more processor(s) 605 can be a custom made or commercially-available processor, a central processing unit (CPU), a plurality of CPUs, an auxiliary processor among several other processors associated with the computing system 601, a semiconductor-based microprocessor (in the form of a microchip or chip set), or generally any device for executing instructions.

The one or more processor(s) 605 may be disposed in communication with one or more memory devices (e.g., the memory 610 and/or one or more external databases 630, etc.) via a storage interface 620. The storage interface 620 can also connect to one or more memory devices including, without limitation, one or more databases 630, and/or one or more other memory drives (not shown) including, for example, a removable disc drive, a vehicle computing system memory, cloud storage, etc., employing connection protocols such as serial advanced technology attachment (SATA), integrated drive electronics (IDE), universal serial bus (USB), fiber channel, small computer systems interface (SCSI), etc.

The memory 610 can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The instructions in the memory 610 can include one or more separate programs, each of which can include an ordered listing of computer-executable instructions for implementing logical functions. In the example of FIG. 6, the instructions in the memory 610 can include an operating system 655. The operating system 655 can control the execution of other computer programs such as, for example, a battery expansion cradle system controller, and provides scheduling, input-output control, file and data management, memory management, and communication control and related services. For example, the memory 610 may include instructions that cause the processor(s) 605 to determine a present position of the mobile device 120 with respect to the forward facing view and the rear-facing view, and reposition the mobile device 120 by sliding the mobile device 120 along the face 300 of the battery module 125 such that the forward-facing camera 305 of the mobile device 120 has the forward-facing view 310 of a forward path of the electric scooter 105. The instructions may be configured to cause the processor(s) to determine that the forward-facing camera 305 of the mobile device 120 does not have the forward-facing view 310 of a forward path of the electric scooter 105 and actuate the actuating member 410, which may be, for example, a mobile device sliding arm, to contact an edge of the mobile device 120 and reposition the mobile device 120.

In other aspects, the memory 610 may cause the processor(s) 605 to interface with an application on the mobile device 120 that determines, using the mobile device gyroscope and other available equipment, whether the user has crashed the eScooter, whether the user is injured, and whether emergency help may be needed. In one aspect, the application may be configured to call an emergency service responsive to determining that the eScooter rider is injured.

The program instructions stored in the memory 610 can further include application data 660, and instructions for controlling and/or interacting with the computer through a user interface 665. The user interface may be, for example, the mobile device 120 and/or another input or output mechanism integrated with the eScooter 105.

The I/O adaptor 615 can connect a plurality of input devices 645 to the computing system 601. The input devices can include, for example, a keyboard, a mouse, a joystick, a microphone, a sensor, etc. The input device(s) 645 may also include one or more virtual keyboard(s) on a touchscreen interface, or another conventional input device.

The I/O adaptor 615 can also connect a plurality of output device(s) 650, which can include, for example, a display, a speaker, a touchscreen, etc. Other output devices can also be included, although not shown.

Finally, the I/O devices 645 and 650 that may be connectable to the I/O adaptor 615 can further include devices that communicate both inputs and outputs, for instance but are not limited to, a network interface card (NIC) or modulator/demodulator (for accessing other files, devices, systems, or a network), a radio frequency (RF) or other transceiver, a Near Field Communication (NFC) device, a Bluetooth® Low energy receiver, an ad-hoc networking device, a bridge, a router, etc.

According to some example embodiments, the computing system 601 can include one or more telecommunications adaptor(s) 640 that may be disposed in communication with mobile telecommunications infrastructure such as, for example, mobile phone towers, satellites, vehicle-to-vehicle network infrastructure, etc. The telecommunications adaptor(s) 640 can also include and/or be disposed in communication with or more other adaptors configured to transmit and/or receive cellular, mobile, and/or other communications protocols for wireless communication. The telecommunications adaptor(s) 640 can also include and/or be disposed in communication with a global positioning system (GPS) receiver 675.

In some embodiments, the communications adaptor 616 may coupling the computing system 601 to one or more network(s) 635. The network(s) 635 may be and or include the Internet, a private network, public network or other configuration that operates using any one or more known communication protocols such as, for example, transmission control protocol/Internet protocol (TCP/IP), Bluetooth®, Wi-Fi, and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples. The network(s) 635 can also be and/or include a packet-switched network such as a local area network, wide area network, metropolitan area network, the Internet, or other similar type of network environment.

The network(s) 635 can operatively connect the computing system 601 to one or more devices including, for example, one or more server(s) 670. The networks(s) 635 may also be disposed in communication with one or more mobile devices 680, which may be substantially similar to and/or identical to the mobile device(s) 120 depicted with respect to FIG. 1.

Figure 7:
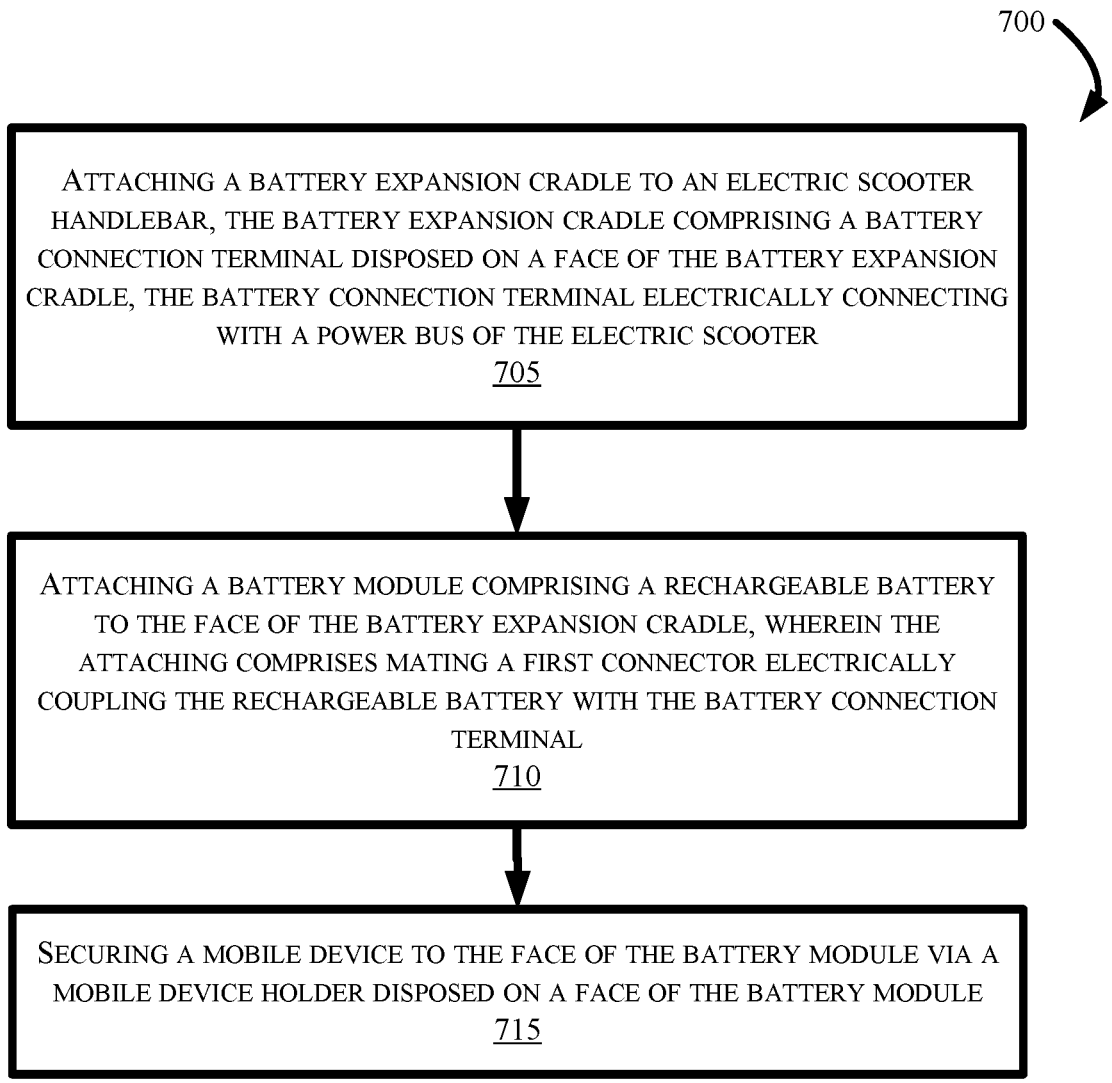
FIG. 7 depicts a flow diagram in accordance with the present disclosure.

FIG. 7 is a flow diagram of an example method 700 for connecting an auxiliary battery power supply to an electric scooter, such as the electric scooter 105 as shown in FIG. 1, according to the present disclosure. FIG. 7 may be described with continued reference to prior figures, including FIGS. 1-6. The following process is exemplary and not confined to the steps described hereafter. Moreover, alternative embodiments may include more or less steps that are shown or described herein, and may include these steps in a different order than the order described in the following example embodiments.

Referring first to FIG. 7, at step 705, the method 700 may commence with attaching a battery expansion cradle to an electric scooter handlebar, the battery expansion cradle comprising a battery connection terminal disposed on a face of the battery expansion cradle, the battery connection terminal electrically connecting with a power bus of the electric scooter.

At step 710, the method 700 may further include attaching a battery module comprising a rechargeable battery to the face of the battery expansion cradle, wherein the attaching comprises mating a first connector electrically coupling the rechargeable battery with the battery connection terminal. Attaching the battery module to the face of the battery expansion cradle can include removably connecting the battery expansion cradle with the battery module via a releasable attachment clip.

At step 715, the securing a mobile device to the face of the battery module via a mobile device holder disposed on a face of the battery module. This step may further include tilting the battery expansion cradle, the battery module, and the mobile device from a position substantially parallel to a handlebar riser of the electric scooter to an angled position with respect to the handlebar riser via an axial pivot mechanism disposed on a connecting member of the battery expansion cradle.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A battery module configured to be removably attachable to a face of a battery expansion cradle for an electric scooter, the battery module comprising:
   a rechargeable battery;
   a first connector configured to electrically couple the rechargeable battery to a second rechargeable battery or to the battery expansion cradle; and
   a mobile device holder disposed on a face of the battery module,
   wherein the mobile device holder comprises a repositioning mechanism configured to reposition the mobile device by sliding the mobile device along the face of the battery module such that a forward-facing camera of the mobile device has a forward-facing view of a forward path of the electric scooter, and
   wherein the repositioning mechanism comprises a processor configured to:
      determine that the forward-facing camera of the mobile device does not have a forward-facing view of a forward path of the electric scooter;
      actuate a mobile device sliding arm to contact an edge of the mobile device; and
      reposition the mobile device by sliding the mobile device along the face of the battery module such that the forward-facing camera of the mobile device has a forward-facing view of a forward path of the electric scooter.

2. The battery module according to claim 1, wherein the first connector is configured to electrically couple the rechargeable battery to the battery expansion cradle or to a second rechargeable battery in a second battery module.

3. The battery module according to claim 2, wherein the battery module comprises
   a releasable attachment clip configured to:
      removably connect the battery expansion cradle with the battery module, or
      removably connect the rechargeable battery to a second battery module.

4. An apparatus for an electric scooter, comprising:
   a battery expansion cradle attachable to an electric scooter handlebar, the battery expansion cradle comprising a battery connection terminal disposed on a face of the battery expansion cradle, the battery connection terminal electrically connectable with a power bus of the electric scooter;
   a first battery module removably attachable to the face of the battery expansion cradle, the first battery module comprising
      a first rechargeable battery, and
      a first connector configured to electrically couple the first rechargeable battery to the battery connection terminal; and
   a mobile device holder disposed on a face of the first battery module,
   wherein the mobile device holder comprises a repositioning mechanism configured to reposition the mobile device by sliding the mobile device along the face of the first battery module such that a forward facing camera of the mobile device has a forward-facing view of a forward path of the electric scooter,
   wherein the repositioning mechanism comprises a processor configured to:
      determine that a forward-facing camera of the mobile device does not have a forward-facing view of a forward path of the electric scooter;
      actuate a mobile device sliding arm to contact an edge of the mobile device; and
      reposition the mobile device by sliding the mobile device across the face of the first battery module such that the forward-facing camera of the mobile device has a forward-facing view of a forward path of the electric scooter.

5. The apparatus according to claim 4, wherein the battery expansion cradle comprises:
   a releasable attachment clip configured to removably connect the battery expansion cradle with the first battery module.

6. The apparatus according to claim 4, wherein the battery expansion cradle comprises an axial pivot mechanism configured to tilt the battery expansion cradle, the first battery module, and the mobile device from a position substantially parallel to a handlebar riser of the electric scooter to an angled position with respect to the handlebar riser, and wherein the battery expansion cradle comprises an axial pivot mechanism configured to moveably secure the battery expansion cradle laterally along the electric scooter handlebar.

7. The apparatus according to claim 6, wherein the angled position with respect to the handlebar riser positions the mobile device to point a rear-facing camera such that a face of a rider is within view of the rear-facing camera.

8. The apparatus according to claim 4, wherein the first connector is configured to electrically couple the first rechargeable battery and/or the battery expansion cradle to a second rechargeable battery in a second battery module.

9. The apparatus according to claim 8, wherein the first battery module comprises
a releasable attachment clip configured to:
removably connect the battery expansion cradle with the first battery module, or
removably connect the first rechargeable battery to the second battery module.

10. The apparatus according to claim 4, wherein the first battery module comprises a mobile device connection port configured to electrically connect with the power bus of the electric scooter and to recharge the mobile device.

11. A method for connecting an auxiliary battery power supply to an electric scooter, the method comprising:
attaching a battery expansion cradle to an electric scooter handlebar, the battery expansion cradle comprising a battery connection terminal disposed on a face of the battery expansion cradle, the battery connection terminal configured to electrically connect with a power bus of the electric scooter;
attaching a battery module comprising a rechargeable battery to the face of the battery expansion cradle, wherein the attaching comprises mating a first connector electrically coupling the rechargeable battery with the battery connection terminal; and
securing a mobile device to the face of the battery module via a mobile device holder disposed on a face of the battery module,
wherein the mobile device holder comprises a repositioning mechanism configured for repositioning the mobile device by sliding the mobile device along the face of the battery module such that a forward-facing camera of the mobile device has a forward-facing view of a forward path of the electric scooter; and
wherein the battery module comprises a processor configured for:
determining that the forward-facing camera of the mobile device does not have a forward-facing view of a forward path of the electric scooter;
actuating a mobile device sliding arm to contact an edge of the mobile device; and
repositioning the mobile device by sliding the mobile device along the face of the battery module such that the forward-facing camera of the mobile device has a forward-facing view of a forward path of the electric scooter.

12. The method according to claim 11, wherein attaching the battery module to the face of the battery expansion cradle comprises:
removably connecting the battery expansion cradle with the battery module via a releasable attachment clip.

13. The method according to claim 11, further comprising:
tilting the battery expansion cradle, the battery module, and the mobile device from a position substantially parallel to a handlebar riser of the electric scooter to an angled position with respect to the handlebar riser via an axial pivot mechanism disposed on a connecting member of the battery expansion cradle.

\* \* \* \* \*